Figure 1:
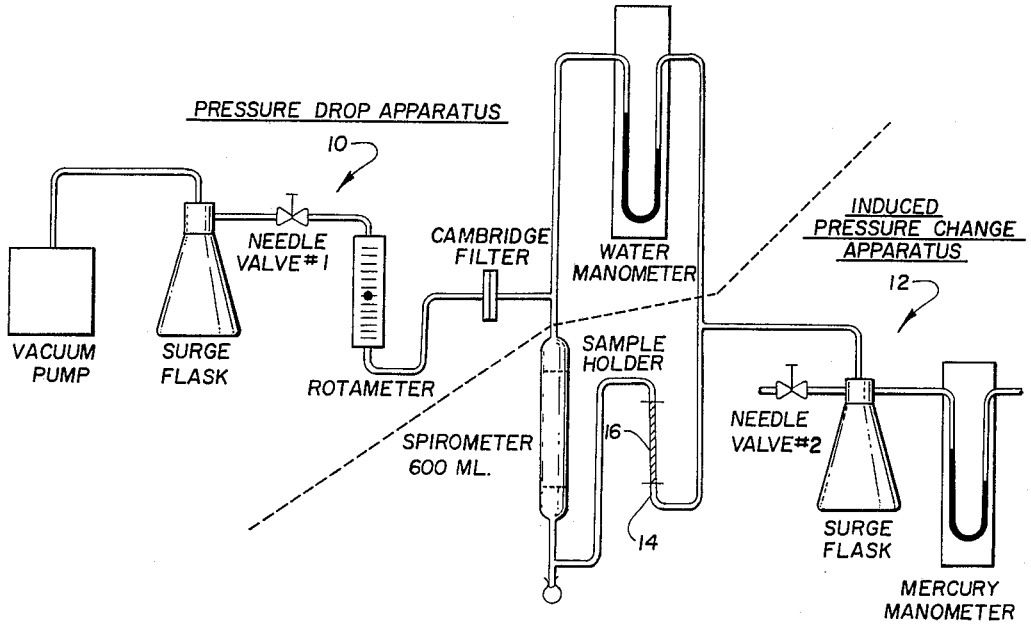
Figure 2:
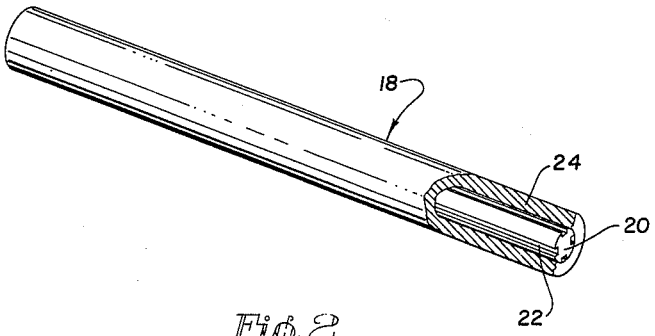

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 4, 1975

940 O.G. 6

T940,004

LAMINAR FLOW DEVICE FOR CALIBRATING A TOBACCO SMOKE FILTER ROD PRESSURE DROP TESTING APPARATUS AND METHOD FOR MAKING DEVICE

Ronald L. Dixon, Rte. 9, 316 Thistlewood Drive, Kingsport, Tenn. 37663

Filed Feb. 1, 1974, Ser. No. 438,817
Int. Cl. G01f *25/00*, F15d *1/02*
U.S. Cl. 73—3
1 Sheet Drawing. 10 Pages Specification

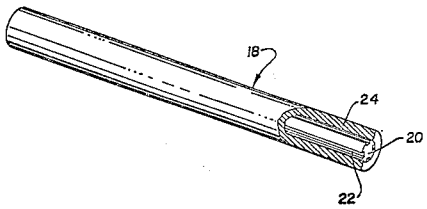

A laminar flow device for calibrating a tobacco smoke filter rod pressure drop testing apparatus, and the method of making such device. The device is a small cylindrical rod having within and spaced around its periphery a plurality of grooves extending axially along its length. The grooves are of constant depth and the cross-sectional area of each groove is small enough to promote laminar flow of a fluid medium through the groove. The open side of each groove is covered by a cylindrical sleeve having an interference fit over the length of the cylindrical rod and being slidably adjustable to cover or uncover a predetermined length of the grooves for determining different pressure drops at predetermined fluid flow rates.

Nov. 4, 1975 R. L. DIXON T940,004

LAMINAR FLOW DEVICE FOR CALIBRATING A TOBACCO SMOKE FILTER RCD PRESSURE DROP TESTING APPARATUS AND METHOD FOR MAKING DEVICE

Original Filed Feb. 1, 1974